Aug. 9, 1960    L. K. NELSON    2,948,288
HOUSE TRAILER AWNING WITH ATTACHING MEANS
Filed Oct. 3, 1957    2 Sheets-Sheet 1
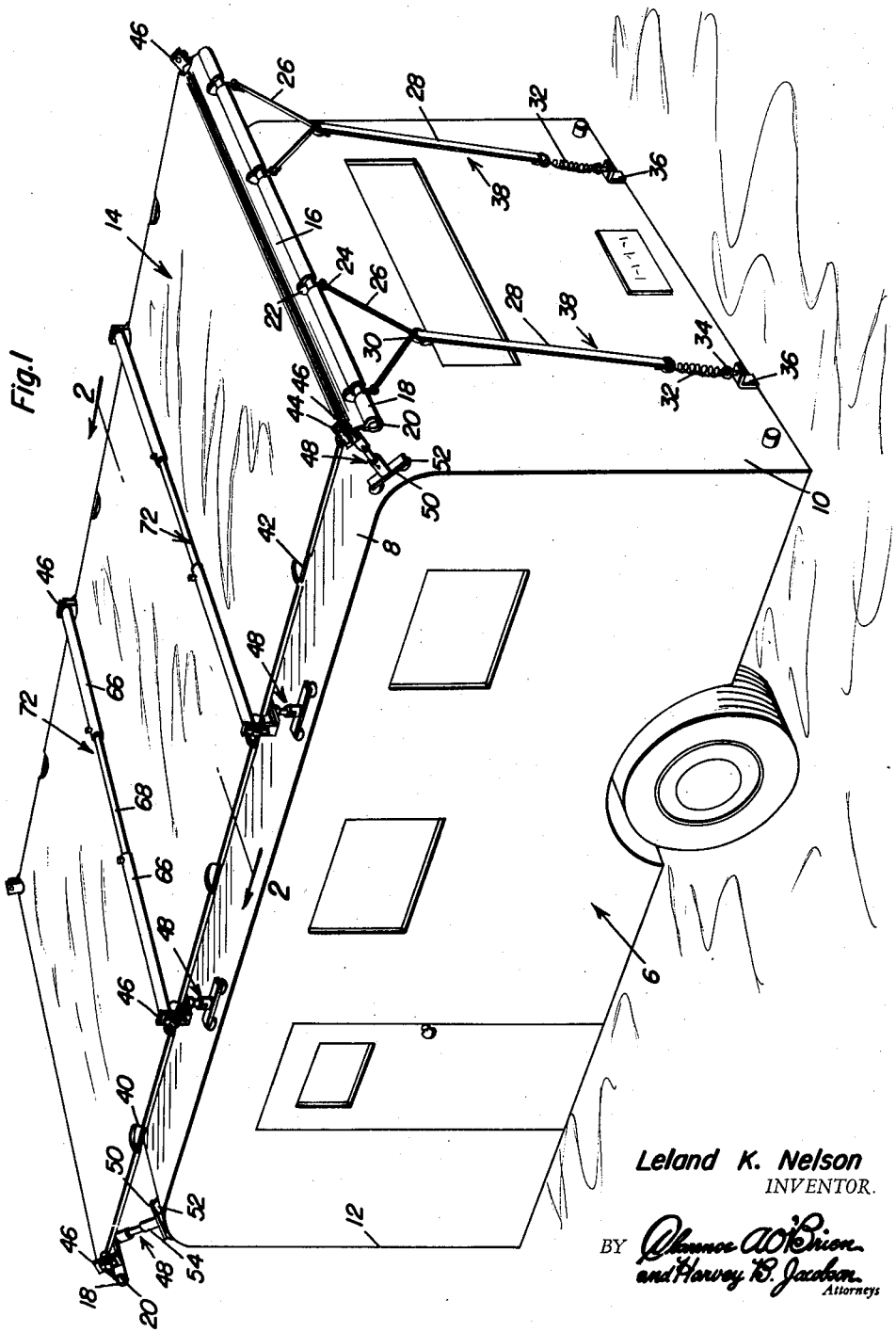
Leland K. Nelson
INVENTOR.

Aug. 9, 1960 L. K. NELSON 2,948,288
HOUSE TRAILER AWNING WITH ATTACHING MEANS
Filed Oct. 3, 1957 2 Sheets-Sheet 2
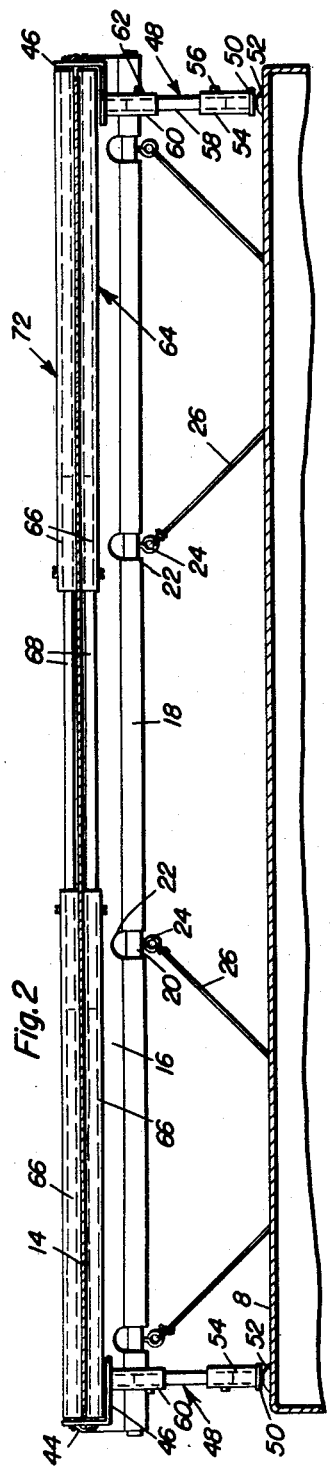
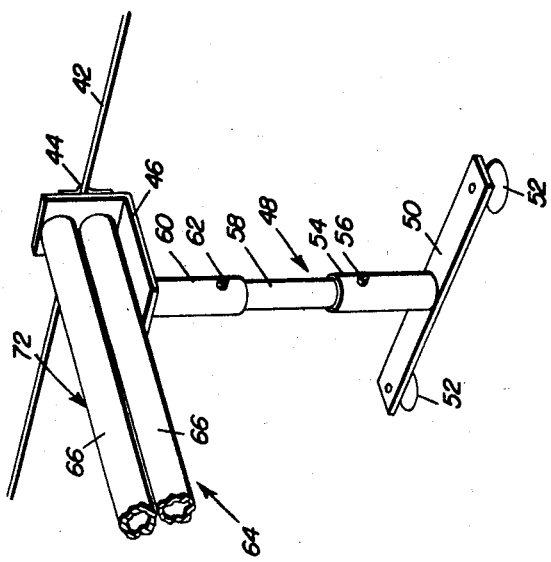
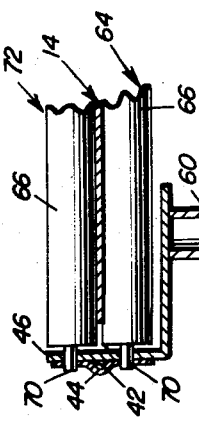
Leland K. Nelson
INVENTOR.

United States Patent Office 2,948,288
Patented Aug. 9, 1960

2,948,288

HOUSE TRAILER AWNING WITH ATTACHING MEANS

Leland K. Nelson, 11717 Corrigan Ave., Downey, Calif.

Filed Oct. 3, 1957, Ser. No. 687,890

3 Claims. (Cl. 135—5)

The present invention relates to certain new and useful improvements in a canvas or an equivalent flexible awning which is expressly designed and adapted to be erected in spaced parallelism above the roof of a trailer and which functions to intercept the rays of the sun and to promote free ventilation between the roof and awning, whereby to more satisfactorily condition the interior of the trailer and to thus better comfort the occupants of the trailer.

Persons conversant with the state of the art to which the invention relates are well aware that it is not new to associate a canopy, awning or an equivalent structure with the roof of trailers and analogous vehicles. It will be evident, therefore, that the purpose of the instant invention is to provide, as an advance in the art, a simple, practical and economical awning which stays put once it is properly erected and yet is such in construction that it may be readily removed and compactly and conveniently stored whenever necessary or desired.

Briefly summarized, the invention is characterized by a shade awning of a width equal to the width of said roof and of a length greater than the length of said roof, readily applicable and removable awning erecting attachments supported atop said roof and suspending said awning in spaced parallelism above said roof, said attachments being vertically adjustable to vary the space between the roof and awning, the forward and rearward transverse end portions of said awning having spreader members attached thereto, and means attached to the respective spreader members and anchored on the trailer for tensioning and tautening said awning.

Novelty is predicated on the construction stated wherein each spreader member comprises a rigid pole held in a hem provided therefor on the end of the awning, said last named means embodying at least one stress and strain equalizing bridle, a strap adjustably linked to said bridle, an elastic guy element attached to the lower end of said strap, and an anchoring bracket fixed to a lower portion of the trailer with said guy-element releasably connected to the bracket.

Novelty is also predicated on the structural means recited wherein the aforementioned attachments embody front and rear horizontal transversely disposed roof-spanning-members over which cooperating end portions of said awning are bridged, drawn, and strained downwardly, each spreader member comprising a rigid horizontal pole mounted in a terminal hem provided therefor at the end of the awning, said poles being situated in a parallel plane below the plane of their respective spanning-members to even the pulling forces applied by way of said tensioning and tautening means.

Other features and advantages will become more readily apparent from the following description and the accompanying drawings.

In the drawings, wherein like numerals are employed to designate like parts throughout the same:

Fig. 1 is a perspective view of a house trailer equipped with the improved awning and showing how the awning is constructed and erected for use.

Fig. 2 is a sectional view on the transverse line 2—2 of Fig. 1 looking in the direction of the arrows, said view being sufficiently enlarged to bring out the details, their construction and arrangement.

Fig. 3 is an enlarged fragmentary view showing one of the post-like struts.

Fig. 4 is a perspective view of the same.

With reference to Fig. 1 the trailer, which is conventional, is denoted at 6 and the roof at 8. The numeral 10 may be said to designate the rearward end and 12 the forward end of the trailer.

The canvas or equivalent awning is denoted as an entity by the numeral 14 and as before stated it is of a width corresponding to the width of the roof 8 and of a length greater than the length of the roof so that the transverse end portions 16 are permitted to hang down over the respective forward and rearward ends. Each transverse end portion is provided with a hem 18 in which the spreader pole 20 is fitted and partly exposed by the cutouts or notches 22. The poles 20 are provided at longitudinally spaced points with screw-eyes 24 to accommodate equalizing bridles 26. These bridles form parts of the holddown devices at the forward and rearward ends and are suitably paired and each device comprises a strap 28 having a link 30 adjustably connected with the bridle. An elastic guy element 32 is connected to the lower end of the strap and in turn is detachably connected at 34 in any suitable manner to a Z-shaped anchoring bracket 36 which is permanently attached to the bottom of the trailer. The respective holddown devices are referred to unitarily by the numerals 38 and each device is the same in construction and the description of one will suffice for all. The awning is also provided along its longitudinal edge portions with hems 40 through which stabilizing cables or wires 42 are passed. The wires are preferably attached to cleats 44 on the angle fixtures 46 attached to the upper ends of the respective struts or posts 48. Each post comprises a base 50 with rubber suction cups 52 and a socket member 54 with a setscrew 56 in which the post 58 is telescopically and adjustably fitted, the upper end of the post being likewise fitted into a similar socket 60 on the fixture and being held by setscrew 62.

These vertically adjustable and detachable struts or posts are employed in proper pairs to detachably mount the devices which are used to support and suspend the awning in its spaced position. There are four such devices and they are all the same in construction but function slightly different from each other. Each device is characterized generally by a roof spanning member denoted generally by the numeral 64 (Fig. 2). This member comprises a pair of tubes 66 in axial alignment and connected together by a centrally disposed tube 68. Thus, each spanning member is extensible and contractible for adjustment needs. The pins 70 (Fig. 3) on the ends thereof are properly mounted in the fixtures 46. Above the two central spanning members similarly constructed stays are provided and these stays are denoted by the numeral 72 in Fig. 1. They are the same in construction as the spanning members 64 therefore the same reference numerals apply. Their purpose is to overlie the awning and to assist in retaining it in position.

The forward and rearward spanning members are mounted as shown at the forward and rearward ends 12 and 10 of the trailer and they are so positioned that they serve to spread and strain as well as bridge the depending end portions 16 of the awning.

By mounting the awning in the manner seen in Fig. 1, it will be evident that the paired holddown devices 38 impose a pulling force on the end portions 16 thus straining and stressing these portions over the end roof-spanning devices while the spreader poles 20 keep the end portions straight and insure that the awning is held securely in place to withstand high winds and to form the desired sun intercepting and ventilating requirements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a trailer having a conventional-type roof, a portable canvas awning of a width equal to the width of said roof and of a length greater than the length of said roof, readily applicable and removable awning erecting attachments supported atop said roof and suspending said awning in spaced parallelism above said roof, said attachments being vertically adjustable to vary the space between the roof and awning, said awning having transverse hems at its forward and rearward ends and having side hems along its longitudinal edge portions, a spreader pole fitted in each transverse hem, stabilizing wires fitted in the longitudinal hems, and holddown means connected to said spreader poles, said means being separably connectible to anchoring brackets provided therefor on the trailer ends, each attachment comprising an extensible and contractible roof-spanning member and L-shaped fixtures at the ends thereof, each fixture being carried by a vertically adjustable post, said post having means at the bottom securing the same in a given position of said roof, portions of said stabilizing wires being secured to said fixtures, said holddown means embodying at least one stress and strain equalizing bridle, a strap adjustably linked to said bridle, an elastic guy element attached to the lower end of said strap, and an anchoring bracket fixed to a lower portion of the trailer with said guy element releasably connected to the bracket.

2. In combination, a trailer having a conventional-type roof, a flexible shade awning of a width equal to the width of said roof and of a length greater than the length of said roof, readily applicable and removable awning erecting attachments supported atop said roof and suspending principal portions of said awning in a position of use spaced from cooperating surfaces of said roof, said attachments being vertically adjustable to vary the space between the roof and awning, the forward and rearward transverse end portions of said awning having spreader members attached thereto, and means attached to the respective spreader members and anchored on the trailer for tensioning and tautening said awning, each attachment embodying front and rear horizontal transversely disposed roof-spanning members over which cooperating end portions of said awning are bridged, drawn, and strained downwardly, each spreader member comprising a rigid horizontal pole mounted in a terminal hem provided therefor at the end of said awning, the respective poles being situated in a parallel plane below their respective spanning members in a manner to even the pulling forces applied by way of said tensioning and tautening means, said last-named means embodying at least one stress and strain equalizing bridle, a strap having an upper end adjustably linked to said bridle, an elastic guy element attached to the lower end of said strap, and an anchoring bracket fixed to a lower portion of the trailer, said guy element being releasably connected to said bracket.

3. Means for attaching and supporting a portion of a canvas awning atop a vehicle roof comprising a pair of opposed correspondingly constructed L-shaped fixtures, each fixture having a vertical portion and a horizontal portion, the vertical portion having a cleat through the medium of which a portion of a hem retaining wire is supported and connected to said vertical portion, a pair of posts having means at the bottom portions thereof whereby said posts may be removably bracketed on a portion of the roof, said fixtures being provided with depending socket members and said socket members being removably and adjustably mounted on the upper ends of said posts, a horizontally disposed roof spanning member longitudinally extensible and contractible and having end portions disposed in proximity with cooperating horizontal portions of said fixtures, a second roof spanning member likewise longitudinally extensible and contractible and disposed in parallelism directly over and in conjunction with said first named member and having its end portions connected with the vertical portions of the respective L-shaped fixtures, there being a minimal space existing between adjacent portions of the roof spanning members, said space being adapted to permit a portion of the canvas awning to be positioned and sandwiched between the roof spanning members.

References Cited in the file of this patent

UNITED STATES PATENTS

| | | |
|---|---|---|
| 785,571 | Raines et al. | Mar. 21, 1905 |
| 1,733,007 | Dahl | Oct. 22, 1929 |
| 1,999,171 | Bryant | Apr. 30, 1935 |
| 2,469,987 | Pilsner | May 10, 1949 |
| 2,496,085 | Engelheart | Jan. 31, 1950 |
| 2,508,757 | Gray | May 23, 1950 |
| 2,573,060 | Rauglas | Oct. 30, 1951 |